July 15, 1952 T. C. LLOYD 2,603,162
WET ARMATURE MOTOR AND PUMP COMBINATION
Filed Dec. 31, 1949
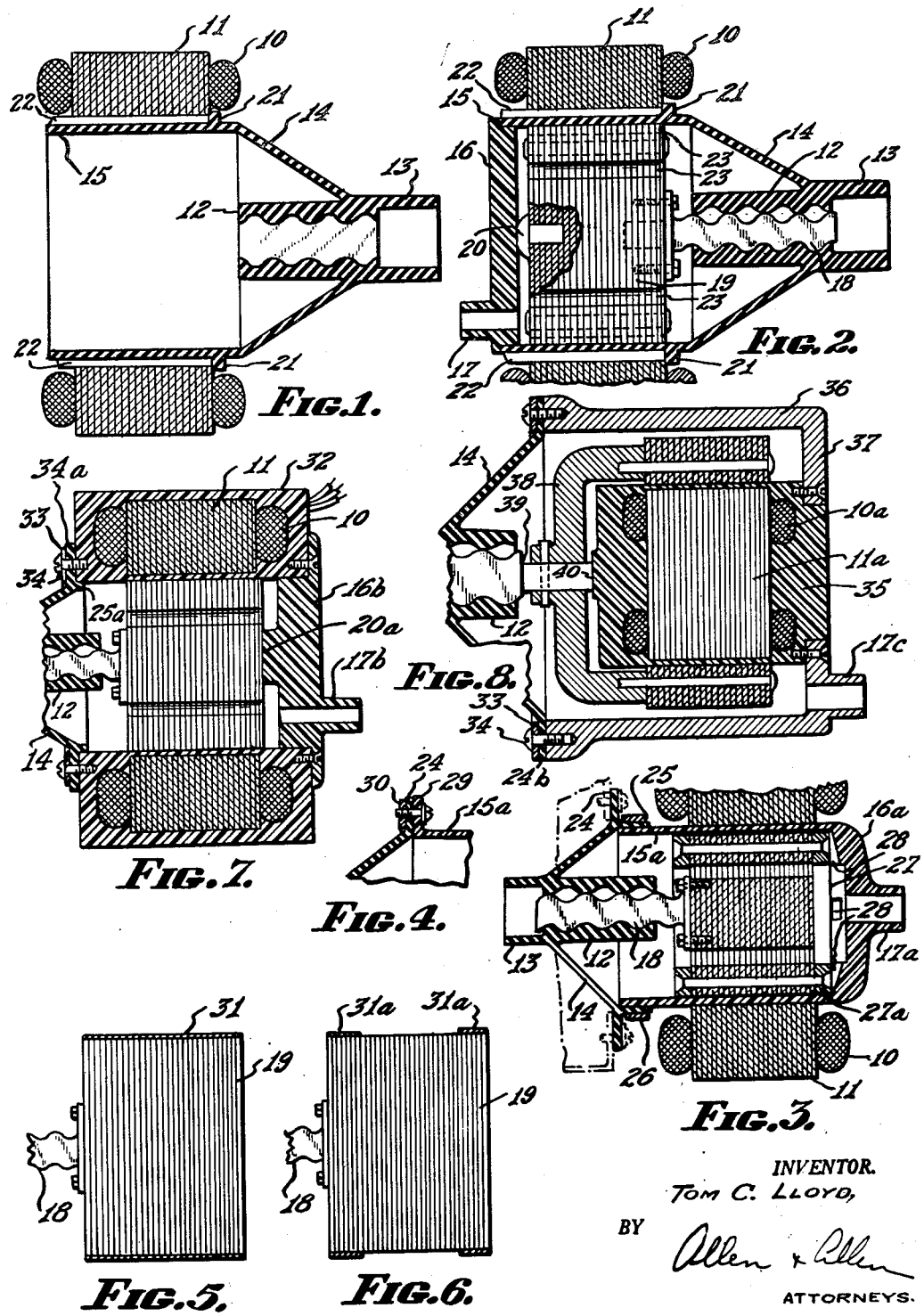
INVENTOR.
Tom C. Lloyd,
BY
Allen & Allen
ATTORNEYS.

Patented July 15, 1952

2,603,162

UNITED STATES PATENT OFFICE 2,603,162

WET ARMATURE MOTOR AND PUMP COMBINATION

Tom C. Lloyd, Springfield, Ohio, assignor to Robbins & Myers, Inc., Springfield, Ohio, a corporation of Ohio Application December 31, 1949, Serial No. 136,190

10 Claims. (Cl. 103—118)

This invention relates to a wet armature motor and pump combination. More specifically it relates to a combination including an electric motor having secured to the armature thereof a pump rotor and a stator adapted to cooperate with the pump rotor which stator is provided with a casing element wherein the armature of the motor actually operates within the pump casing and is isolated from the field coils of the motor so that the fluid being pumped passes through and about the armature and lubricates the armature bearing.

The particular pump illustrated is of the type disclosed by R. J. L. Moineau in his Patent No. 1,892,217, issued December 27, 1932. This pump has a rotor having an external helical thread of rounded contour and a stator having internal helical threads of rounded contour, the stator having one thread more than the rotor. Specifically also, the pump portion portion of the combination embodies the improvements disclosed in a co-pending application of Byram and Zimmer, Serial No. 159,079, filed April 29, 1950.

According to the said co-pending application, the stator member is provided with a port extension substantially coaxial with the stator and with a funnel-like casing member surrounding the stator portion, the stator portion, port portion and funnel-like portion being integrally molded from a single piece of resilient material.

There are many installations where a very small and compact motor and pump unit are required and where the competitive price situation requires a combination of extreme cheapness. There are many installations where a pump according to the Moineau patent mentioned above would be highly desirable except for its generally higher cost. It is therefore an object of the present invention to provide a motor pump combination which will be very much cheaper than prior combinations inasmuch as it will eliminate motor armature bearings and also because it may eliminate a pump casing member in the conventional sense of the phrase.

While the invention is illustrated specifically in connection with a pump according to the Moineau patent, having a stator member according to the Byram and Zimmer application, it will be clear that other types of pumps may be used. It is therefore an object of the invention to provide a motor and pump combination having the advantages described and operating upon the principles to be set forth, regardless of the specific type of pump employed.

It is another object of the invention to provide a unit which will be extremely compact. Other objects include the provision of a combination as above outlined which will be efficient in operation and which will not require a great deal of service or maintenance.

These and other objects of the invention which will be pointed out in more detail as the description proceeds or which will be apparent to one skilled in the art upon reading the specifications are accomplished by that construction and arrangement of parts of which there are shown certain exemplary embodiments.

Reference is made to the drawings forming a part hereof in which:

Figure 1 is a cross sectional view of the field coil portion of an electric motor and the stator portion of a pump.

Figure 2 is a view similar to Figure 1 showing the rotor portion of the pump and the motor armature in position.

Figure 3 is a view similar to Figure 2 but showing a modified sleeve arrangement.

Figure 4 is a fragmentary detailed cross sectional view of a modification in the connection between the funel-like portion of the stator and an isolating sleeve.

Figure 5 is an elevational view of a motor armature showing in cross section a bearing band.

Figure 6 is a view similar to Figure 5 showing a modification thereof.

Figure 7 is a view similar to Figure 3 showing another modification.

Figure 8 is a view similar to Figure 7 showing a still further modification.

Briefly, in the practice of my invention I provide a motor and pump combination wherein the armature for the motor is isolated from the field coils thereof by means of a sleeve or sheath of one form or another which sleeve constitutes also a part of the pump casing. The motor armature has one of the working elements of the pump secured thereto so that the liquid being pumped passes through and out the motor armature, and the armature has its bearing on the inside of the isolating sleeve which bearing is of course lubricated by the liquid being pumped. Bearings and seals are thereby eliminated from the combination according to my invention. The invention is, of course, applicable to the combination between a motor and any kind of rotary pump, but it has particular utility in connection with a pump operating according to the Moineau patent mentioned above, and throughout the specification and drawings reference has been made to a pump of that general type.

In the particular embodiments disclosed, I utilize the teachings of the above mentioned co-pending application of Byram and Zimmer to achieve the objects of the present invention. I extend in one way or another the funnel-like casing portion of the stator member to form an isolating sleeve between the field coils and the armature of the motor. I make provision for closing the open end of the sleeve except for a port, and I secure the pump rotor to the armature of the motor so that the water or other liquid being pumped flows through and about the armature as it is being pumped. The armature bears peripherally against the isolating sleeve which thus becomes a water lubricated bearing and is lubricated by the water being pumped. Generally speaking, the fundamental points of departure of the present invention are that the armature and field coils of the motor are isolated from each other and that the liquid being pumped passes right through the motor armature so that in a sense the armature may be said to rotate within the pump casing and that seals and bearings are eliminated. In my co-pending application Serial No. 136,189, filed December 31, 1949, I have disclosed a motor-pump combination of the general type described herein, but wherein motor armature bearings are provided.

Referring now in greater detail to the drawings and beginning with the showings of Figures 1 and 2, the field coils of a motor are indicated at 10 and are shown as being wound about a core indicated generally at 11. The pump stator is indicated at 12 and in accordance with the teachings of the said co-pending application Serial No. 159,079, is provided with a port extension at 13 and a funnel-like casing at 14. I extend the funnel-like portion 14 by means of a cylindrical portion at 15. The cylindrical portion 15 is of such outside diameter that it fits snugly within the core of the field coils as shown.

Referring now to Figure 2, the open end of the cylindrical portion 15 is closed by a plug member 16 which may be of rubber, plastic or any suitable material and which is provided with a port fitting 17. The pump-rotor 18 is secured to the motor armature which is indicated generally at 19. Assuming that liquid is pumped through the device, entering at the fitting 17 and leaving at the fitting 13, there will be a leftward thrust upon the pump rotor 18 and armature 19, and in order to take up this thrust I may provide a thrust button 20 which may bear against the end plug 16 as shown. It will be clear that the water or other liquid being pumped will entirely fill the volume inside the members 14, 15 and 16 and will thus lubricate the bearing between the armature 19 and the cylindrical sleeve member 15.

While in most cases no provision will be necessary to prevent rotation of the sleeve 15 within the core 11 a provision may be made to prevent such twisting as shown in Figures 1 and 2. As there shown, the cylindrical portion 15 may be provided with an annular flange 21 and a number of ribs 22 which constitute keys to engage in appropriately disposed slots in the core 11. The flange 21 bears against the face of the core 11 and assists in positioning the cylindrical member 15 in relation to the core.

The armature is shown as being provided with lubricant grooves 23 to permit better passage of the lubricant which is being pumped through the casing between the armature and sleeve. It will of course be understood that the grooves could be provided in the sleeve if desired.

Instead of extending the funnel-like casing portion 14 into the isolating sleeve, as shown in the figures discussed above, I may make the isolating sleeve separately of a piece of plastic or the like having a thin cylindrical portion 15a. The end plug may be molded integrally therewith as indicated at 16a and may be provided with the port fitting 17a. The assembly of this is shown in Figure 3, and for this purpose the funnel-like portion 14 of the stator may be provided with the annular right angled flanges 24 and 25. The annular flange 25 may be clamped around the open end of the member 15a by means of a clamping band 26, and the annular flange 24 may serve as a fastening flange to fasten the unit to any suitable frame element.

In Figure 3 I have also shown a way in which end thrusts can be taken up wherein an annular bearing ring 27a is secured to the armature which bears against the bearing surface 27 molded into the member 16a. The bearing surface 27 is provided with a suitable number of depressions 28 to permit lubrication of the surface 27.

In Figure 4 I have shown a modification of the construction of Figure 3 where the sleeve 15a may be provided with an annular flange 29 and where in the funnel-like portion the flange 25 is eliminated, and the flange 24 is secured directly to the flange 29 and to a suitable frame element 30.

In some installations it may be desirable to provide an auxiliary bearing surface. Such an arrangement is shown in Figures 5 and 6 where the motor armature 19 is banded with a band 31 of a suitable bearing material which band will then bear against the isolating sleeve. The band may be continuous, as shown at 31 in Figure 5, or it may consist of several separated bands as indicated at 31a in Figure 6.

It will be understood that if manufacturing considerations indicate it to be desirable, the sleeve 15a need not have an integral end plug but may be provided with a separate end plug having a port fitting.

Coming now to a description of Figures 7 and 8, I have here shown several modifications wherein the isolating sleeve is constituted of a block of suitable plastic material within which the field coils are cast. The field coils are thus isolated by the block within which they are cast from the liquid which is being pumped. In Figure 7 the field coil 10 and the field core 11 are cast within an annular block 32. The funnel-like stator portion 14 is provided with flanges 24a and 25a and the pump stator assembly is secured to the annular block 32 by means of a retaining ring 33 and the screws 34 which engage into the block 32. The open end of the block 32 is then closed by an end plug 16b having a port fitting 17b. The end plug member 16b may have molded integrally therewith an end thrust member 20a. In this embodiment the armature has its rotary bearing against the inside cylindrical surface of the block 32 which may be suitably machined for smoothness and may, of course, if desired, be provided with grooves as in the case of Figures 1 and 2.

As described above in connection with the description of Figure 3, the end plug member need not be separate, but may be cast integrally with the block 32.

The embodiment of Figure 8 is analogous to that of Figure 7 except that here the armature is annular in form and rotates exteriorly of the field coils which again are cast into a block of suitable plastic material. The field coils are here indicated at 10a and the field core at 11a, and they are cast into a cylindrical block 35. The block 35 has secured to it a casing element 36 having an inturned annular flange 37 which is secured to the block 35 and which includes a port fitting 17c. The pump stator element is secured to the open end of the member 36 by means of screws 34, the clamping ring 33 and the flange 24b. In this instance the armature comprises a cup-shaped element 38 which is suitably pinned or otherwise secured to the pump rotor shaft 39 and the rotor shaft 39 may serve as the means for taking up end thrusts by bearing against a boss 40 on the block 35. In this instance the inner cylindrical surface of the armature bears against the outer cylindrical surface of the block 35 and is again water lubricated, as described above.

In the foregoing description I have described numerous minor modifications in order to give an idea of the versatility of the invention. All of the embodiments which have been described embody certain fundamental principles. These principles are that the field coils and armature of the motor are isolated from each other so that the liquid being pumped cannot contact the field coils. In all the embodiments the liquid being pumped passes around and through the motor armature, and in all of the embodiments the armature periphery bears against the inner periphery of the sleeve, and is lubricated by the liquid being pumped, and in all of the embodiments the armature may be thought of as rotating within the pump casing.

It will be clear that numerous modifications other than those disclosed above may be made without departing from the spirit of the invention, and therefore I do not intend to limit myself in any manner whatsoever except as set forth specifically in the claims which follow.

Having now fully described my invention, what I claim as new and desire to secure by Letters Patent is:

1. In combination, an electric motor having field coils, an armature, and an armature bearing, said field coils being separated from said armature by a liquid-tight sheath, said armature having operatively connected thereto a pump rotor, means for closing both ends of said sheath, an inlet port in one of said closing means, an outlet port in the other of said closing means, one of said closing means being funnel shaped and of flexible material, and a pump stator disposed within said funnel shaped closing means and in operative relation to said pump rotor, whereby the liquid being pumped by said combination flows through and about said armature and lubricates said sheath, said sheath serving as said armature bearing.

2. In combination, an electric motor having field coils, an armature, and an armature bearing, said field coils being separated from said armature by a liquid-tight sheath, said armature having secured thereto coaxially a helical pump rotor, means for closing both ends of said sheath, an inlet port in one of said closing means, an outlet port in the other of said closing means, one of said closing means being funnel shaped and of flexible material, and a pump stator disposed within said funnel shaped closing means, whereby the liquid being pumped by said combination flows through and about said armature and lubricates said sheath, said sheath serving as said armature bearing.

3. The combination of claim 2, in which said pump stator is integral with said funnel shaped closing means.

4. The combination of claim 2, in which said entire funnel shaped closing means and stator is molded of a single piece of resilient material.

5. The combination of claim 2, in which one of said closing means is integral with said sheath.

6. The combination of claim 2, in which said funnel shaped closing means is integral with said sheath.

7. The combination of claim 2, in which means are provided for bearing the end thrust of said armature.

8. The combination of claim 2, in which said sheath and one of said closing means are integral, and in which the other of said closing means comprises said funnel-like closing means.

9. The combination of claim 2, in which said armature is provided with an annulus of bearing material to bear against said sheath.

10. The combination of claim 2, in which said sheath comprises an annulus of plastic material in which said field coils are embedded.

TOM C. LLOYD.

REFERENCES CITED

The following references are of record in the file of this patent:

UNITED STATES PATENTS

| Number | Name | Date |
|---|---|---|
| 1,780,337 | Canton | Nov. 4, 1930 |
| 1,780,338 | Canton | Nov. 4, 1930 |
| 1,780,339 | Canton | Nov. 4, 1930 |
| 1,849,222 | Canton | Mar. 15, 1932 |
| 1,881,344 | Apple | Oct. 4, 1932 |
| 1,892,217 | Moineau | Dec. 27, 1932 |
| 1,911,128 | Apple | May 23, 1933 |
| 1,983,262 | Zorzi | Dec. 4, 1934 |
| 2,161,374 | Moineau | June 6, 1939 |
| 2,212,417 | George | Aug. 20, 1940 |
| 2,317,517 | Brace | Apr. 27, 1943 |
| 2,317,520 | Coons | Apr. 27, 1943 |
| 2,450,963 | Hoover | Oct. 12, 1948 |